United States Patent
Rocco et al.

(10) Patent No.: US 11,898,491 B1
(45) Date of Patent: Feb. 13, 2024

(54) WATER PRESSURE AND QUANTITY MONITORING FOR HYDROGEN STEAM INJECTED AND INTER-COOLED TURBINE ENGINE

(71) Applicant: RAYTHEON TECHNOLOGIES CORPORATION, Farmington, CT (US)

(72) Inventors: Edward Thomas Rocco, Rocky Hill, CT (US); Danbing Seto, Avon, CT (US); Coy Bruce Wood, Ellington, CT (US); Liang Tang, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/870,123

(22) Filed: Jul. 21, 2022

(51) Int. Cl.
*F02C 3/30* (2006.01)
*F02C 3/22* (2006.01)
*F02C 7/18* (2006.01)

(52) U.S. Cl.
CPC .................. *F02C 3/30* (2013.01); *F02C 3/22* (2013.01); *F02C 7/185* (2013.01); F05D 2220/323 (2013.01); F05D 2260/211 (2013.01); F05D 2260/213 (2013.01); F05D 2260/2322 (2013.01); F05D 2260/607 (2013.01); F05D 2260/80 (2013.01); F05D 2270/3015 (2013.01)

(58) Field of Classification Search
CPC ...... F02C 3/20; F02C 3/22; F02C 3/24; F02C 3/30; F02C 7/185; F05D 2220/323; F05D 2260/211; F05D 2260/213; F05D 2260/2322; F05D 2260/607; F05D 2260/80; F05D 2270/3015; F01D 25/32
See application file for complete search history.

(56) References Cited

U.S. PATENT DOCUMENTS

| | | | | |
|---|---|---|---|---|
| 7,550,218 | B2 * | 6/2009 | Hoffjann | F02C 6/00 60/648 |
| 9,267,433 | B2 * | 2/2016 | Zhang | F02C 3/305 |
| 9,464,573 | B2 * | 10/2016 | Remy | F02C 7/22 |
| 10,557,413 | B1 * | 2/2020 | Shepherd | F02C 9/00 |
| 11,635,022 | B1 * | 4/2023 | Terwilliger | F02C 9/00 60/775 |
| 11,674,731 | B2 * | 6/2023 | Knatt | F25C 1/22 62/344 |
| 11,686,222 | B2 * | 6/2023 | Hu | B01D 53/265 60/806 |

(Continued)

FOREIGN PATENT DOCUMENTS

| | | | | |
|---|---|---|---|---|
| EP | 3875741 | A1 * | 9/2021 | F02C 3/30 |
| WO | 2022028651 | A1 | 2/2022 | |
| WO | WO-2022223073 | A1 * | 10/2022 | |

*Primary Examiner* — Craig Kim
(74) *Attorney, Agent, or Firm* — Carlson, Gaskey & Olds, P.C.

(57) ABSTRACT

A propulsion system for an aircraft includes a hydrogen fuel system, a water recovery system and a water pressure and quantity monitoring system. The water recovery system uses a condenser to extract water from an exhaust gas flow. The water pressure and quantity monitoring system measures water pressures and quantities at various locations in the water recovery system to assess the health and efficiency of the water recovery/supply system and the propulsion system.

12 Claims, 2 Drawing Sheets

(56) References Cited

U.S. PATENT DOCUMENTS

| | | | |
|---|---|---|---|
| 11,686,256 B2* | 6/2023 | Kathirchelvan | G01H 17/00 60/39.24 |
| 2005/0266287 A1* | 12/2005 | Hoffjann | B64D 11/02 429/513 |
| 2008/0115483 A1* | 5/2008 | Moore | C10K 1/02 60/734 |
| 2010/0221642 A1* | 9/2010 | Frahm | B64D 41/00 429/512 |
| 2011/0011096 A1* | 1/2011 | Edwards | F02C 7/141 429/492 |
| 2013/0098056 A1* | 4/2013 | Zhang | F02C 3/305 60/39.55 |
| 2017/0082034 A1* | 3/2017 | Scipio | F02C 7/22 |
| 2020/0191048 A1* | 6/2020 | Homison | F02B 37/20 |
| 2020/0317360 A1* | 10/2020 | Rheaume | C02F 1/00 |
| 2020/0318538 A1* | 10/2020 | Partheepan | F02C 7/16 |
| 2021/0207500 A1* | 7/2021 | Klingels | F01K 23/10 |
| 2021/0207540 A1* | 7/2021 | Roberge | F02C 7/22 |
| 2021/0277839 A1* | 9/2021 | Madden | F02C 9/28 |
| 2023/0035231 A1* | 2/2023 | Hu | B01D 5/0075 |
| 2023/0120297 A1* | 4/2023 | Butler | B64D 33/08 290/52 |
| 2023/0145545 A1* | 5/2023 | Löytty | F01K 23/10 29/888.021 |
| 2023/0176030 A1* | 6/2023 | Johnson | G01R 27/22 703/10 |

* cited by examiner

WATER PRESSURE AND QUANTITY MONITORING FOR HYDROGEN STEAM INJECTED AND INTER-COOLED TURBINE ENGINE

TECHNICAL FIELD

The present disclosure relates generally to a hydrogen powered aircraft propulsion system and, more particularly to a system and method of monitoring water pressure and quantity for water utilized for intercooling and steam generation and injection.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to one example disclosed embodiment includes, among other possible things, a core engine that includes a core flow path where air is compressed in a compressor section, communicated to a combustor section, mixed with a hydrogen-based fuel and ignited to generate a high energy gas flow that is expanded through a turbine section. A hydrogen fuel system is configured to supply hydrogen fuel to the combustor through a fuel flow path. A water recovery system includes a condenser that is arranged along the core flow path that is configured to extract water from the high energy gas flow. A water pressure monitoring system measures a water pressure at various locations in the water recovery system. A water level sensing system is disposed in the water storage tank for water quantity monitoring. A controller is programed to control the water recovery system based on information that is communicated from the water pressure monitoring system, and to monitor the water pressure and quantity to ensure the adequate flow of water/steam that is circulated in the system for optimal engine efficiency and assess the health of the water recovery/supply system. An evaporator is in thermal communication with a core engine heat source and configured to generate a steam flow from a portion of water extracted by the condenser. The steam flow is injected into the core flow path upstream of the turbine section.

In a further embodiment of the foregoing, the propulsion system includes a water storage tank that receives water that is extracted by the condenser and a water level sensor that is disposed in the water storage tank. The water level sensor communicates information indicative of a quantity of water in the storage tank to the controller.

In a further embodiment of any of the foregoing, the controller is programmed to determine the water quantity circulated in the water recovery/supply system.

In a further embodiment of any of the foregoing, the controller is programmed to track the water quantity and alert for low water quantity.

In a further embodiment of any of the foregoing, the controller is programmed to identify abnormal water consumption for alert of possible water leakage.

In a further embodiment of any of the foregoing, the controller is programmed to determine whether a relationship between the monitored water pressure and a monitored steam pressure is within at least one of an expected range and an expected pattern among all sensors and generate an alert if a detected relationship between the monitored water pressure and the monitored steam pressure is outside of the expected range.

In a further embodiment of any of the foregoing, the controller is programmed to fuse information regarding water pressures and water quantity to determine a condition of the water recovery system.

In a further embodiment of any of the foregoing, the controller is programmed to fuse information regarding water pressure, steam pressure and water quantity with information gathered regarding a core air flow, high energy gas flow and exhaust gas flow through the core engine to ascertain an operating condition of the propulsion system.

In a further embodiment of any of the foregoing, the propulsion system includes a water pressure sensor that is configured to measure water pressure between the condenser and the water storage tank.

In a further embodiment of any of the foregoing, the propulsion system includes a water pressure sensor that is configured to measure water pressure between the water storage tank and a low-pressure water pump.

In a further embodiment of any of the foregoing, the propulsion system includes a water pressure sensor that is configured to measure water pressure between a high-pressure water pump and the evaporator and a water pressure sensor that is configured to measure steam pressure downstream of the evaporator.

In a further embodiment of any of the foregoing, the propulsion system includes a water pressure sensor that is configured to measure water pressure downstream of a boost pump. The boost pump provides a water flow for cooling a cooling air flow directed to the turbine section.

A water recovery system health monitoring system for an aircraft propulsion system, the water recovery health monitoring system according to another example disclosed embodiment includes, among other possible things, a condenser that is configured to extract water from a high energy gas flow, and at least one water pressure sensor that is configured to measure a water pressure downstream of the condenser. A controller is programed to determine a health of a water recovery system based on information that is communicated from the at least one water pressure sensor.

In a further embodiment of the foregoing, the water recovery system health monitoring system includes a water quantity monitor that is configured to communicate information indicative of a quantity of water in a water storage tank to the controller.

In a further embodiment of any of the foregoing, the controller is programmed to determine an expected range of water pressure and the expected range level of water in the water storage tank based on an engine operating condition.

In a further embodiment of any of the foregoing, the controller is programmed to determine that a fault condition is present in response to a measured quantity of water within the water storage tank being outside of the expected range level of water.

In a further embodiment of any of the foregoing, the controller is programmed to detect a fault condition of a water filter in response to a measured pressure differential across the filter being outside the expected of water pressures.

A method of monitoring the water recovery system health for an aircraft propulsion system, the method according to another example disclosed embodiment includes, among other possible things, detecting a water pressure with a sensor that is located downstream of a condenser arranged along a core flow path for extracting water from a high energy gas flow, communicating to a controller a signal indicative of a pressure of the extracted water with the sensor, and generating a prompt indicative of one of a plurality of predefined engine operating conditions by way of a signal that is generated by the controller in response to the communicated pressure being outside an expected range that corresponds with at least one of the plurality of predefined engine operation conditions.

In a further embodiment of any of the foregoing, the method further includes communicating a water level within a water storage tank to the controller and generating the prompt in response to the communicated water level and the communicated pressure corresponds with at least one of the plurality of predefined engine operating conditions.

In a further embodiment of any of the foregoing, the generated prompt prompts one of an inspection action, maintenance action and/or adjustment to engine operation action.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
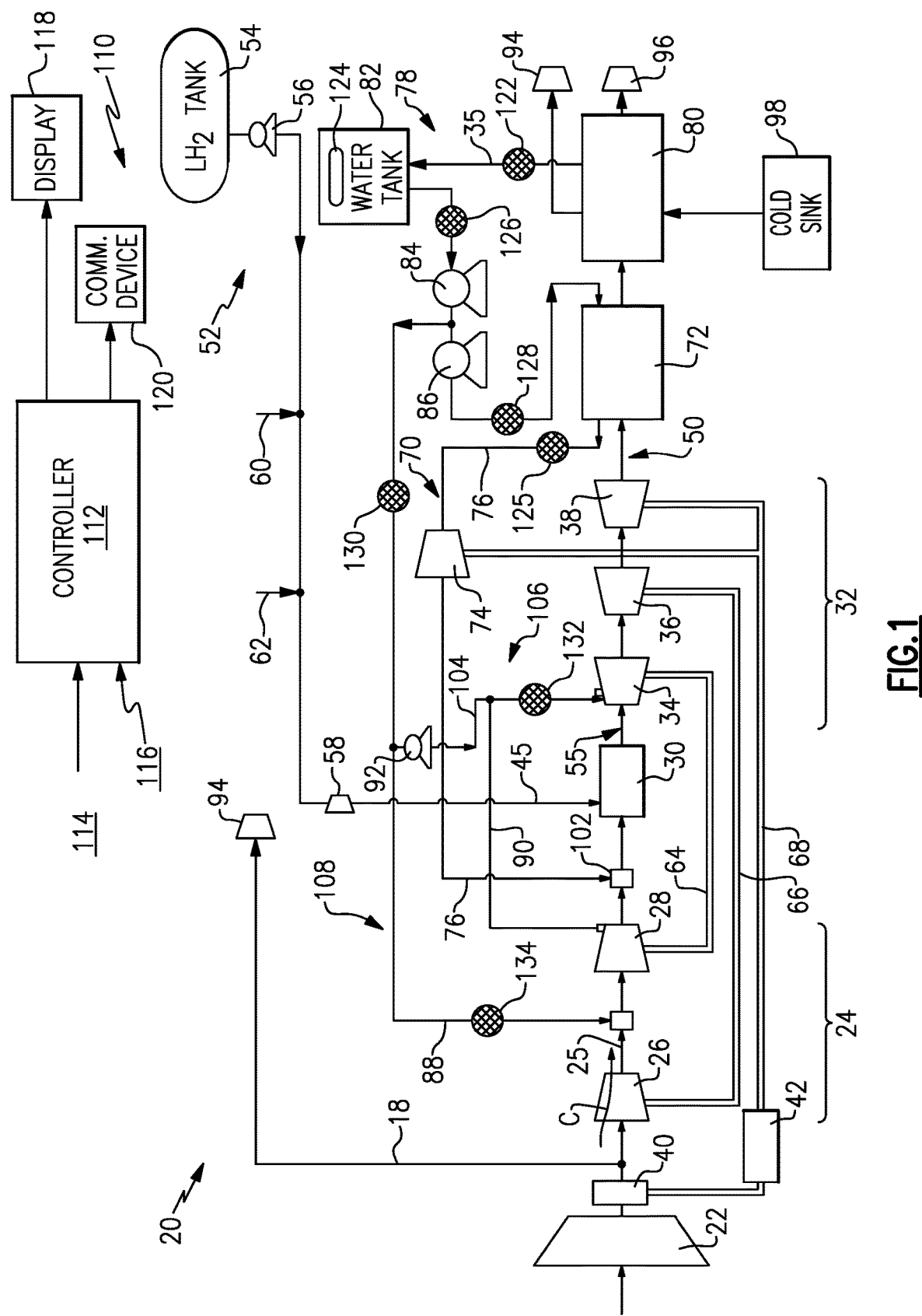
FIG. 1 is a schematic view of an example propulsion system embodiment.

FIG. 1 schematically illustrates an example aircraft propulsion system embodied in the form of a hydrogen steam injected inter-cooled turbine engine that is generally indicated at 20. The engine 20 includes a water recovery system 78 that extracts water from an exhaust flow 50 and a water pressure monitoring system 110 that provides information indicative of a pressure and quantity extracted water. Water pressure and quantity are parameters indictive of engine operating efficiencies and more specifically of operation of the water recovery and steam injection systems. Accordingly, the water pressure and quantity are monitored at various locations throughout the engine 20. Moreover, water pressure and quantity that fall outside of expected ranges can be indicative of anomalies that can reduce engine operating efficiency.

The engine 20 includes core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55. The gas flow expands through the turbine section 32 where energy is extracted and utilized to drive the fan 22 and the compressor section 24. A bypass flow, indicated schematically at 18, may flow through the fan 22, bypass the remaining components of the core engine, and exit through a fan nozzle 94. The exhaust gas flow 50 exhausted from the turbine section 32 is communicated through a steam generation system 70 and a water recovery system 78 before being exhausted through a core nozzle 96.

The example compressor section 24 includes a low-pressure compressor (LPC) 26 and a high-pressure compressor (HPC) 28. The turbine section 32 includes a high-pressure turbine (HPT) 34, an intermediate pressure turbine (IPT) 36, and a low-pressure turbine (LPT) 38. The turbines 34, 36 and 38 are coupled to a corresponding compressor section. In this disclosed example, the high-pressure turbine is coupled by a high shaft 64 to drive the high-pressure compressor 28. An intermediate shaft 66 couples the intermediate turbine 36 to the low-pressure compressor 26.

A low shaft 68 is coupled to the low-pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

Although the example engine 20 is described and shown by way of example as a three-spool engine, other engine configurations, such as two-spool may also benefit from this disclosure and are within the contemplation and scope of this disclosure.

The engine 20 includes a fuel system 52 that includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increases the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides shaft work that may be used to drive engine or aircraft accessory devices.

The steam injection system 70 uses heat from the exhaust gas flow 50 to generate a steam flow 76 by evaporating high pressure water through an evaporator 72. The generated steam may then be injected into compressed core airflow at a location 102 for communication into the combustor 30. Injecting steam in to the core airflow prior to the turbine section 32 provides an increased mass flow and power output without additional work required by the compressor section 24. In one example embodiment the location for injection of steam 76 is upstream of the combustor 30. Other alternate locations for injection of the steam flow could be utilized within the contemplation and scope of this disclosure. Steam flow from the evaporator 72 may drive a steam turbine 74 to provide an additional work output prior to injection into the combustor 30.

The water recovery system 78 draws water, schematically indicated at 35, from the exhaust gas flow 50 and communicates the recovered water to a water storage tank 82. The water storage tank 82 operates as an accumulator to provide enough water for operation during various engine operating conditions. A condenser/water separator 80 is provided downstream of the turbine section 32 and the evaporator 72. The condenser/separator 80 is in communication with a cold sink, schematically indicated at 98. The cold sink 98 for the condenser/separator 80 may be, for example, ram or fan air depending on the application and/or engine configuration.

The engine 20 has an increased power output from the injected steam 76 due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel.

The water recovery system 78 includes the water storage tank 82 that receives water from the condenser/water separator 80 and provides for the accumulation of a volume of water required for production of enough amounts of steam. Water recovered from the exhaust gas flow 50 is driven by a low-pressure pump 84 and a high-pressure pump 86 to the evaporator 72.

The example engine 20 further includes a water intercooling system, shown schematically at 108. The intercooling system 108 injects and mixes an intercooling water flow 88 with the core airflow 25 to cool and increase the mass of the core airflow 25 through the compressor section 24. Heating and boiling of water injected into the core airflow 25 lowers the temperature of the core airflow 25 and increases the mass flow through subsequent portions of the compressor section 24. Reduced temperatures and increased mass flow provided by injection of water decreases the work required by the compressor section 24.

A cooled cooling air system 106 is also include and communicates a cooled cooling air flow 90 from the compressor section 24 to the turbine section 32. A boost pump 92 provides for communication of a water flow 104 to cool the cooling air flow 90. The boost pump 92 elevates a pressure of the water flow 104 to correspond with a pressure of the air flow 90. The water flow 104 may be combined with the air flow 90 and/or used as a cooling medium to further cool airflow communicated into the turbine section 32.

The extraction of water from the exhaust gas flow 50 to provide steam injection into the core airflow 25 provides improved engine efficiencies but also requires additional monitoring and maintenance to assure operation within desired operating parameters. Contaminants and/or debris that migrate into the extracted water may affect engine efficiencies. Moreover, water condition and pressure provide information utilized to prompt engine maintenance operations.

The disclosed water pressure monitoring system 110 includes various pressure sensors arranged to monitor water pressure and communicate with a controller 112. The water pressure sensors are arranged to monitor water pressure at different locations throughout the engine 20. The monitored water pressures are used to confirm that the engine 20 is operating as desired and/or to detect anomalies that may be indicative of a condition that requires attention. Such conditions can include leakage of water, freezing of water or some other blockage that alters water flow from an expected operating range, and degradation or failure of water pumps.

In one disclosed example embodiment, a first pressure sensor 122 is disposed downstream of the condenser 80 and prior to the water tank 82. Water pressure in this location provides information indictive of proper operation of the condenser 80. Water pressure just downstream of the condenser 80 may also be indictive of a content of the exhaust gas flow 50. A reduction in water pressure may be caused by a reduction in the amount of water in the exhaust gas flow 50 available for extraction.

A quantity sensor 124 is provided in the water tank 82 to monitor the amount of water present. The amount of water within the water tank 82 may also be indictive of condenser operation and may further be indictive of anomalies in water distribution from the water tank 82. A blockage to water flow after the water tank 82 would result in a water level more than an expected water level. Moreover, a lower than expected water level may be an indication of a leak or a reduction in water extraction by the condenser 80.

A second water pressure sensor 126 is disposed after the water tank 82 and before the first low pressure pump 84. Water pressure in this location may be indicative of pump operation and of a water level in the water tank 82. Excess pressure prior to the pump 84 may result from excess water in the water tank 82 and/or a blockage in the pump 84. Lower than expected pressures may indicate a leak or errant operation of the pump 84. As appreciated, other phenomena may cause either an increase or reduction in an expected water pressure.

A third water pressure sensor 128 is provided after the high-pressure pump 86 and prior to the evaporator 72. A fourth water pressure sensor 125 is disposed in a passages downstream of the evaporator 72. Pressures at the third and fourth pressure sensors 128, 125 may provide an indication of the efficiency of the evaporator 72 in generating the steam flow 76. Deviations in expected pressures may indicate that the evaporator 72 and/or high-pressure pump 86 are not performing as desired. The fourth water pressure sensor 125 may further provide information regarding steam flow 76 generated in the evaporator 72. Moreover, the third and fourth water pressure sensors 128, 125 may provide information used to adjust water flow to tailor steam generation to engine operating conditions.

A fifth water pressure sensor 130 is provided downstream of the low-pressure pump 84 to measure water flow being communicated to the intercooling system 108 and/or the cooled cooling air system 106. Deviations in water pressure of water flowing to these systems may be indicative of a deviation from desired system operation. A sixth water pressure sensor 132 is provided after the booster pump 92 to provide information indicative of operation of the cooled cooling air system 106. A seventh water pressure sensor 134 is provided near the water injection location of the intercooling system 108. The fifth, sixth and seventh pressure sensors 130, 132 and 134 operate in a corresponding manner to monitor operation and isolate anomalies that may occur within each system.

Although various locations for water pressure sensors are disclosed by way of example, other locations of water pressure sensors may be utilized within the scope and contemplation of this disclosure. Moreover, combined information for the various pressure sensors may provide indication of different operating anomalies that are not specifically noted but that fall within the contemplation and scope of this disclosure.

Each of the pressure sensors 122, 125, 126, 128, 130, 132 and 134 are configured to send a signal, schematically shown cumulatively at 114, that is indicative of a water pressure to the controller 112. The signal 114 may be communicated in any known manner as individual signals from each pressor sensor or as cumulative signals from a group of pressure sensors. The quantity sensor 124 sends a signal, schematically shown at 116 to the controller 112 that is indicative of the level of water in the storage tank 82. The signal 116 may also be communicated to the controller 112 in any of several known manners.

The controller 112 is programmed to process water pressure information from the various pressure sensors 122, 125, 126, 128, 130, 132, and 134 and the quantity sensor 124 to generate an output for a display 118 or other communication device as schematically indicated at 120. The controller 112 may be part of an overall engine or aircraft controller or may be a separate processing device for the water monitoring system. 110. The controller 112 may be implemented as software instructions saved in a suitable memory device.

The controller 112 uses the information to prompt routine inspection and maintenance procedures and/or to detect operational anomalies that are indictive of system degradation. Detected pressures from each or several of the various pressure sensors 122, 125, 126, 128, 130, 132, and 134 may each indicate different engine and system operating issues.

Moreover, an interrelation of water pressures across the various pressure sensors 122, 125, 126, 128, 130, 132, and 134 may be utilized to confirm and detect proper operation. Water pressures at the various locations may fall with an expected range of relationship for normal engine operation. Relationships between different pressures may provide an indication of an operating anomaly. Accordingly, the controller 112 is programmed to use all the gathered information to inform and prompt actions associated with engine operation.

In an example, the relationship between water pressures and quantity may be used to isolate and troubleshoot system faults. A combination of decreasing water quantity and low water/steam pressure may indicate a system leak. A combination of low system pressure and stable or increasing water quantity may indicate a failure of a system pump. An increase in system pressure may indicate a frozen water line or system clog from contaminates and/or debris. A frozen waterline can be isolated from a system clog from contaminates and/or debris based on the response to a thermal input. The addition of heat by directed hot air or other thermal heating techniques may restore system pressures, indicating the source of the pressure increase was due to frozen water rather than non-water debris. A stable system pressure with decreasing water quantity may be a symptom of reduced condenser efficiency.

Figure 2:
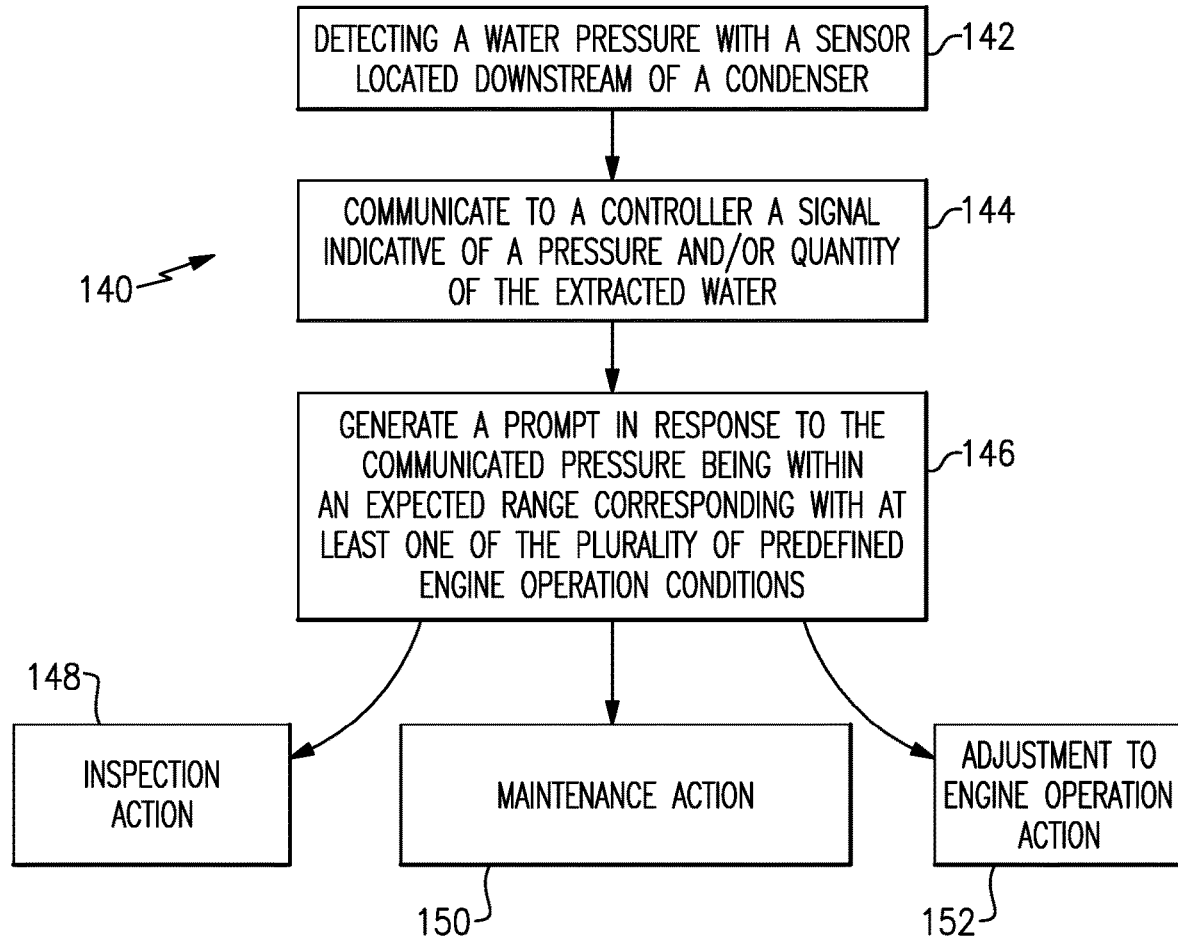
FIG. 2 is a flow diagram of an example monitoring water pressure monitoring process.

Referring to FIG. 2 with continued reference to FIG. 1, a process of monitoring water pressure is schematically shown by flow diagram 140. The process begins with the continued and ongoing detection of water pressure at various locations downstream of the condenser 80 as indicated at 142. The detected and measured pressures are communicated to the controller 112 as indicated at 144. The controller 112 process the communicated information as indicated at 146 to generate a prompt in response to the communicated pressure being within an expected range corresponding with at least one of a plurality of engine operating conditions.

The example controller 112 may be programmed to associate various individual water pressures and different locations along with combinations of different pressures with a plurality of engine operating conditions. In one disclosed example, the controller 112 is programmed to fuse information regarding water pressures and water quantity to determine a condition of the water recovery system. Upon receiving water pressure information, the controller 112 may generate a response corresponding to the stored associations. Moreover, for each of the stored associates, a predefined action can be indicated. Accordingly, the example controller 112 is programmed to fuse information regarding water pressure, steam pressure and water quantity with information gathered regarding a core air flow 25, the high energy gas flow 55, and the exhaust gas flow 50 through the engine 20 to ascertain an operating condition of the propulsion system.

In one disclosed example embodiment, the detected water pressure communicated to the controller 112 corresponds with an engine operating condition that indicates that an inspection action occur as indicated at 148. Another engine operating condition may prompt a maintenance action as indicated at 150. Yet another engine operating condition corresponding with the detected water pressure may prompt an adjustment to engine operation as indicated at 152. Adjustment to engine operation may be performed automatically or prompt action by an operator.

It should be appreciated that although different means of using the gathered water pressure information are disclosed by way of example other monitoring algorithms that combine water pressure information and quantity information may be utilized to prompt engine health maintenance activities and provide for anomaly detection.

Although an example engine configuration and systems are described by way of example, it will be appreciated that other engine configurations may include additional structures and features and are within the contemplation and scope of this disclosure.

Accordingly, the disclosed water pressure and quantity monitoring system provides for monitoring of engine operation and detection of anomalies that may alter engine operating efficiencies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a core engine including a core flow path where air is compressed in a compressor section, communicated to a combustor section, mixed with a hydrogen-based fuel and ignited to generate a high energy gas flow that is expanded through a turbine section;
   a hydrogen fuel system configured to supply hydrogen fuel to the combustor through a fuel flow path;
   a water recovery system including a condenser arranged along the core flow path that is configured to extract water from the high energy gas flow;
   a water pressure monitoring system measuring a water pressure at various locations in the water recovery system;
   a water level sensing system disposed in the water storage tank for water quantity monitoring;
   a controller programed to control the water recovery system based on information communicated from the water pressure monitoring system, and to monitor the water pressure and quantity to assess the health of the water recovery/supply system; and
   an evaporator in thermal communication with a core engine heat source and configured to generate a steam flow from a portion of water extracted by the condenser, wherein the steam flow is injected into the core flow path upstream of the turbine section.

2. The propulsion system as recited in claim 1, including a water storage tank receiving water extracted by the condenser and a water level sensor disposed in the water storage tank, the water level sensor communicating information indicative of a quantity of water in the storage tank to the controller.

3. The propulsion system as recited in claim 2, wherein the controller is programmed to determine the water quantity circulated in the water recovery/supply system.

4. The propulsion system as recited in claim 2, wherein the controller is programmed to track the water quantity and alert for low water quantity.

5. The propulsion system as recited in claim 1, wherein the controller is programmed to identify abnormal water consumption for alert of possible water leakage.

6. The propulsion system as recited in claim 1, wherein the controller is programmed to determine whether a relationship between the monitored water pressure and a monitored steam pressure is within at least one of an expected range and an expected pattern among all sensors and generate an alert if a detected relationship between the monitored water pressure and the monitored steam pressure is outside of the expected range.

7. The propulsion system as recited in claim 1, wherein the controller is programmed to fuse information regarding water pressures detected by discrete sensors and water quantity to determine a condition of the water recovery system.

8. The propulsion system as recited in claim 7, wherein the controller is programmed to fuse information regarding the water pressures, steam pressure and the water quantity with information gathered regarding a core air flow, high energy gas flow and exhaust gas flow through the core engine to ascertain an operating condition of the propulsion system.

9. The propulsion system as recited in claim 1, including a water pressure sensor configured to measure water pressure between the condenser and the water storage tank.

10. The propulsion system as recited in claim 1, including a water pressure sensor configured to measure water pressure between the water storage tank and a low-pressure water pump.

11. The propulsion system as recited in claim 1, including a first water pressure sensor configured to measure water pressure between a high-pressure water pump and the evaporator and a second water pressure sensor configured to measure steam pressure downstream of the evaporator.

12. The propulsion system as recited in claim 1, including a water pressure sensor configured to measure water pressure downstream of a boost pump, wherein the boost pump provides a water flow for cooling a cooling air flow directed to the turbine section.

* * * * *